(12) United States Patent
Renders

(10) Patent No.: US 6,360,551 B1
(45) Date of Patent: Mar. 26, 2002

(54) METHOD AND DEVICE FOR TESTING AND DIAGNOSING AN AUTOMOTIVE AIR CONDITIONING SYSTEM

(75) Inventor: Marie Joseph Renders, Beersel (BE)

(73) Assignee: Ecotechnics S.p.A. (IT)

( * ) Notice: Subject to any disclaimer, the term of this patent is extended or adjusted under 35 U.S.C. 154(b) by 0 days.

(21) Appl. No.: 09/445,007
(22) PCT Filed: Jun. 1, 1998
(86) PCT No.: PCT/EP98/03255
§ 371 Date: Nov. 30, 1999
§ 102(e) Date: Nov. 30, 1999
(87) PCT Pub. No.: WO98/54019
PCT Pub. Date: Dec. 3, 1998

(30) Foreign Application Priority Data

May 30, 1997  (IT) .......................................... FI97A0134

(51) Int. Cl.⁷ ................................................. F25B 49/00
(52) U.S. Cl. .......................................... 62/127; 62/129
(58) Field of Search .......................... 62/125, 127, 129

(56) References Cited

U.S. PATENT DOCUMENTS

| | | | |
|---|---|---|---|
| 4,755,957 A | | 7/1988 | White et al. ................. 364/551 |
| 4,798,055 A | * | 1/1989 | Murray et al. ................ 62/127 |
| 4,967,567 A | | 11/1990 | Proctor et al. ................ 62/127 |
| 5,009,076 A | | 4/1991 | Winslow ....................... 62/129 |
| 5,231,841 A | * | 8/1993 | McClelland et al. ........... 62/125 |
| 5,295,360 A | * | 3/1994 | Olds et al. ..................... 62/127 |
| 5,311,745 A | * | 5/1994 | Lockhart et al. ............... 62/127 |
| 5,495,722 A | * | 3/1996 | Manson et al. ................ 62/125 |
| 5,743,465 A | * | 4/1998 | Jeong ........................... 236/51 |
| 5,816,059 A | * | 10/1998 | Ficchi, Jr. et al. ............. 62/127 |
| 5,850,209 A | * | 12/1998 | Lemke et al. ................ 345/156 |
| 5,884,202 A | * | 3/1999 | Arjomand ..................... 701/29 |

FOREIGN PATENT DOCUMENTS

WO        WO 94/08809        4/1994

* cited by examiner

*Primary Examiner*—William E. Tapolcal
(74) *Attorney, Agent, or Firm*—Welsh & Katz, Ltd.

(57) ABSTRACT

Test and diagnosis of an automotive air conditioning system (2) is performed by a device which comprises: temperature-sensing means (3) for sensing the ambient temperature, pressure-sensing means (4,5) for sensing the high and low side pressures of the system (2), data-storage means (62) for storing at least one set of reference values of refrigerant pressures and ambient temperatures and at least one set of malfunction diagnosis, a data processor (63) for comparing said sensed values of ambient temperature and refrigerant pressures with said stored reference values and for associating to each tern of sensed values at least one diagnosis, which is displayed on a display unit (7), an input unit (8) and an hand-heldable housing (10) for containing said sensing and data-storage means (3–5,62), said data processor (63) and said display and input units (7,8).

3 Claims, 2 Drawing Sheets

METHOD AND DEVICE FOR TESTING AND DIAGNOSING AN AUTOMOTIVE AIR CONDITIONING SYSTEM

The present invention relates to a method and a device for testing and diagnosing an automotive air conditioning system.

From U.S. Pat. No. 4,755,957 and U.S. Pat. No. 4,967,567 methods and apparatus for servicing an automobile air conditioning system are already known in which electronic processing means including a microprocessor are provided for initially diagnosing the system.

It is an object of the present invention to provide an improved method and device for an effective, quick and simple test and diagnosis of an automotive air conditioning system. It is a further object of the present invention to provide a method for testing and diagnosing air conditioning system wherein it is considered only the type of refrigerant and whether the system has a compressor with fixed or variable capacity, irrespective of type of automobile and/or system manufacturer.

It is another object of the present invention to provide a hand-holdable, self-contained, light-weight device which allows any operator to carry out efficient test and diagnosis of automotive air conditioning systems.

The above and other objects of the presente inventions are accomplished by means of the method and device defined in the independent claims. Advantageous embodiments of the invention are defined in the dependent claims.

The invention will be now described by way af example and with reference to the accompanying drawings in which:

FIG. 1 schematically illustrates an air conditioning system with a testing and diagnosing device according to the invention;

Figure 1:
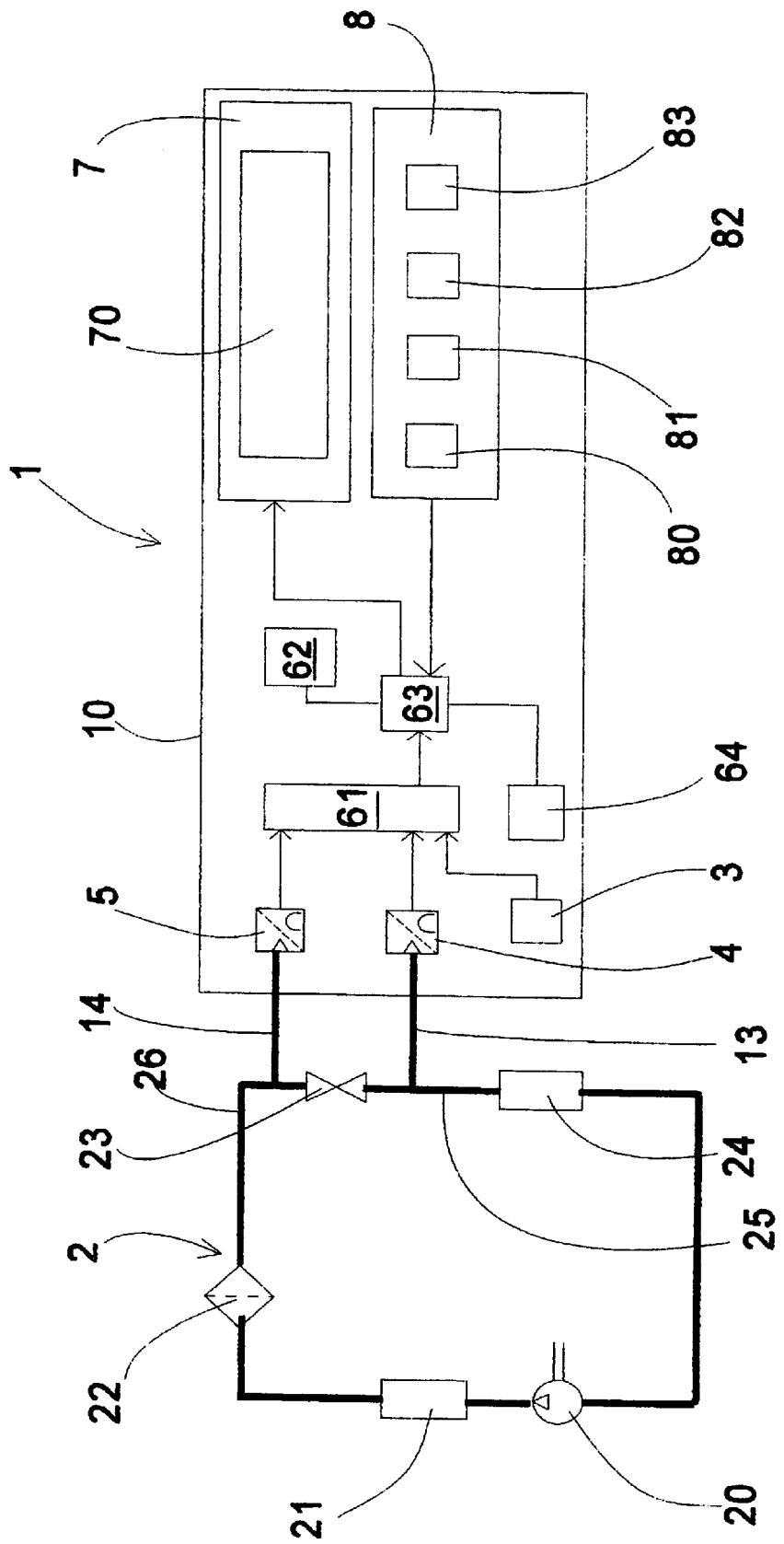

Referring to FIG. 1, there is shown a testing and diagnosing device 1 according to the invention connected to a tipical automotive air conditioning system 2. The system includes a compressor 20, a condenser 21, a filter 22, an expansion valve 23 and an evaporator 24. For purposes of charging and servicing, the system is usually provided with a pair of valve nipples (not shown) at the low 25 and high 26 pressure sides respectively.

The testing and diagnosing device 1 comprises:
- an ambient temperature trasducer 3;
- a low side pressure trasducer 4,
- a high side pressure trasducer 5;
- an analog to digital converting unit 61 for converting the analog outputs of the trasducers to digital signals;
- a memory 62;
- a digital signal processor 63 connected to the unit 61 and to the memory 62;
- a display unit 7;
- an input unit 8.

In a preferred embodiment (shown in FIG. 1) the device also comprises an I/O interface 64, preferably of type RS232, for connection with an external device such as printer or a personal computer. Advantageously all the above mentioned components of the device 1 are contained in a housing 10 described below in greater detail.

The device 1 can be provided with external trasducers (not shown) for sensing the refrigerant temperature before and after the evaporator 24. A further external trasducer (not shown) can be provided for sensing the temperature at an air outlet of the conditioning system.

In the memory 62 are stored reference values of refrigerant pressures and ambient temperature for each kind of refrigerant (generally R-32 or R-134a) and a set of diagnosis with related checking or repair instructions. Preferably two set of diagnosis are provided, for air conditioning systems having a compressor with fixed or variable capacity respectively.

The digital signal processor 63 is arranged to compare the input data from the pressure trasducers 4,5 and the temperature trasducer 3 with the values stored in the memory 62 and to associate to each tern of sensed values (ambient temperature, high and low pressures) at least a diagnosis, which is displayed on the display unit 7. The measured values are also displayed for testing purposes. Where the type of refrigerant or compressor is to be selected, this is done through the input unit 8. The digital signal processor 63 is also arranged to verify the operation of the trasducers 3–5.

Figure 2:
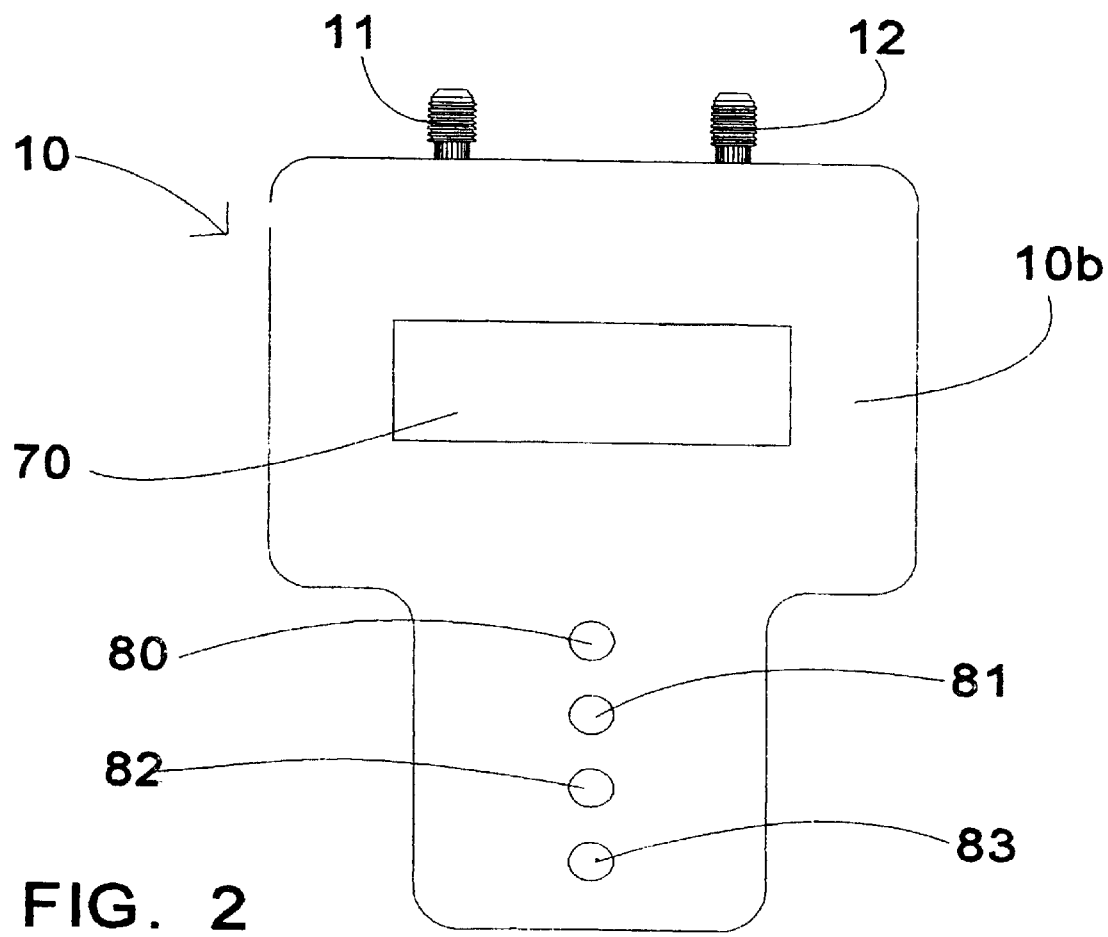
FIG. 2 is a plan view of a preferred embodiment of the hand-holdable housing of the device.
Figure 3:
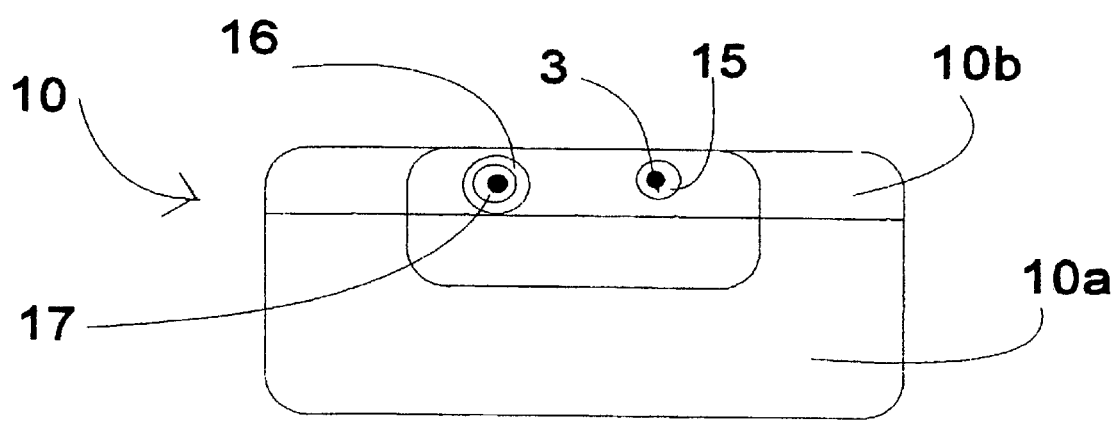
FIG. 3 is a front view of the housing of FIG. 2.

Referring now to FIGS. 2 and 3, there is shown a hand-heldable housing 10 for housing the components of the testing and diagnosing device. In a preferred embodiments (shown in FIGS. 2 and 3) the housing 10 is formed in two parts, a base 10a and a cover 10b, and is provided with nipples 11,12 for connecting the pressure trasducers 4,5 to the low 25 and high 26 pressure sides of the system via hoses 13,14 (see FIG. 1).

Close to the temperature trasducer 3, an opening 15 is provided in the housing for proper ambient temperature sensing. A further opening 16 is provided for connecting a low voltage connector 17 to a low voltage source (f.i. the car battery). A still further opening (not shown) is provided for connection with the I/O interface 64.

The cover 10b of the housing 10 is provided with the display 70 of the display unit 7 and with a plurality of input keys 80–83 of the input unit 8 (typically ON/OFF, RESET, ENTER, FORWARD).

The housing 10 can be made of plastic and, as it is clearly shown in FIGS. 2 and 3, has a practical hand-heldable form. Furthermore a device according to the present invention is light-weight and can be used by unexperienced operator.

I claim:

1. A hand holdable device for testing and diagnosing an automotive air conditioning system, said automotive air conditioning system having a high pressure side with a condenser, a low pressure side with an evaporator through which cool air is created, said sides being respectively downstream and upstream of a compressor, said high and low pressure sides having respective valve nipples on the refrigerating circuit, comprising:

a hand holdable housing;

means for sensing the high pressure valve on the high pressure side arranged in said housing, said means for sensing the high pressure value having a high pressure transducer, a high pressure nipple for communicating with said high pressure transducer; a high pressure hose for releasably connecting said high pressure nipple with said valve nipple of said high pressure side, said means for sensing the high pressure valve generating high pressure signals;

means for sensing the low pressure valve on the low pressure side arranged in said housing, said means for sensing the low pressure value having a low pressure transducer, a low pressure nipple for communicating with said low pressure transducer; a low pressure hose for releasably connecting said low pressure nipple with said valve nipple of said low pressure side, said means for sensing the low pressure valve generating high pressure signals;

means for sensing the ambient temperature value, having a temperature transducer arranged in said housing and an opening made in said housing at said temperature transducer, said means for sensing the ambient temperature generating ambient temperature signals;

data storage means arranged in said housing for storing at least one set of reference values of refrigerant high and low pressure and ambient temperature as well as at least one set of malfunction diagnosis;

a data processor arranged in said housing for comparing said high, low pressure signals and said ambient temperature signal with said set of malfunction diagnosis, said data processor generating a malfunction signal when said set of malfunction diagnosis fits said high, low pressure signals and said ambient temperature signals;

a display unit arranged in said housing for displaying said malfunction signal.

2. Hand holdable device according to claim 1, wherein an input unit is provided in said hand holdable housing having a plurality of input keys.

3. Hand holdable device according to claim 1, wherein an I/O interface is provided in said hand holdable housing for connection with an external device.

* * * * *